(12) United States Patent
Hauzeray

(10) Patent No.: US 7,010,985 B2
(45) Date of Patent: Mar. 14, 2006

(54) GAUGE FOR MEASURING FUEL LEVEL IN A TANK, AND A SYSTEM FOR MEASURING THE WEIGHT OF FUEL IN THE TANK

(75) Inventor: Sylvain Hauzeray, Plaisir Cedex (FR)

(73) Assignee: Intertechnique, (FR)

( * ) Notice: Subject to any disclaimer, the term of this patent is extended or adjusted under 35 U.S.C. 154(b) by 10 days.

(21) Appl. No.: 10/785,461

(22) Filed: Feb. 24, 2004

(65) Prior Publication Data

US 2004/0194545 A1    Oct. 7, 2004

(30) Foreign Application Priority Data

Feb. 26, 2003  (FR) .................................. 03 02345

(51) Int. Cl.
*G01L 9/12* (2006.01)
(52) U.S. Cl. ...................................................... 73/718
(58) Field of Classification Search ................ 73/700, 73/718, 724, 304; 361/284
See application file for complete search history.

(56) References Cited

U.S. PATENT DOCUMENTS

| 2,841,164 A | | 7/1958 | Williamson |
| 2,849,882 A | | 9/1958 | Lee |
| 2,998,559 A | * | 8/1961 | Smith ........................ 361/284 |
| 3,638,491 A | * | 2/1972 | Hart ........................ 73/304 C |
| 4,038,871 A | * | 8/1977 | Edwards ................... 73/304 C |

FOREIGN PATENT DOCUMENTS

DE    29 19 972 A1    11/1980

\* cited by examiner

*Primary Examiner*—Edward Lefkowitz
*Assistant Examiner*—Andre Allen
(74) *Attorney, Agent, or Firm*—Dean W. Russell; Kilpatrick Stockton LLP

(57) ABSTRACT

The gauge comprises concentric inner and outer tubes made of insulating material, with two capacitors each constituted by a set of electrodes, each set having at least one pair of two electrodes in strip form extending along the gauge and placed facing each other on the facing walls of the inner and outer tubes.

8 Claims, 2 Drawing Sheets

GAUGE FOR MEASURING FUEL LEVEL IN A TANK, AND A SYSTEM FOR MEASURING THE WEIGHT OF FUEL IN THE TANK

CROSS-REFERENCE TO RELATED APPLICATION

This application claims priority to French Patent Application No. 03 02345 filed on Feb. 26, 2003, the contents of which are incorporated herein by reference.

The invention relates to the field of gauging the fuel contained in one or more tanks of a vehicle, and in particular of an airplane. It relates in particular to the gauges that are to be placed in a tank to measure the level or depth of liquid fuel in the tank, and to measurement systems incorporating such gauges.

BACKGROUND OF THE INVENTION

Particularly in an airplane, it is essential to be aware at all times of the quantity, and above all the residual weight, of fuel contained in the tank or tanks.

At present, use is made above all of a system comprising a capacitive gauge, or more frequently a plurality of gauges distributed in the or each tank, and suitable for delivering an electrical signal representative of the length of the gauge that is immersed in fuel. Thus, each gauge enables the level of the free surface of the fuel to be measured. The gauges are connected to a computer which also receives signals coming from other sensors, giving information concerning the specific gravity, the dielectric constant, and/or the temperature of the fuel, thereby making it possible to determine the residual weight with high accuracy.

OBJECTS AND SUMMARY OF THE INVENTION

The invention relates more particularly to capacitive fuel gauges comprising two concentric metal or metallized tubes constituting a capacitor of capacitance that varies as a function of the length of the gauge that is dipped in the fuel.

Safety concerns often make redundancy in measurement. That is why present-day measurement systems mounted on airplanes make use of two sets of gauges that are independent from each other. Thus, a fault occurring in one set does not deprive the crew of information concerning the weight of fuel that is available.

Doubling the number of gauges increases weight, and in an airplane that is an unfavorable factor. The present invention seeks in particular to provide a gauge that ensure redundancy in a manner that is simple and inexpensive, leading to a measurement system of lighter weight than previously-known systems providing the same level of redundancy.

The invention provides in particular a gauge comprising concentric inner and outer tubes made of insulating material, and two capacitors each formed by a set of electrodes, each set having at least one pair of two electrodes in the form of strips extending along the gauge and placed facing each other on facing walls of the inner and outer tubes.

In general, the strips are disposed longitudinally, parallel to the common axis of the tube. Nevertheless, there is nothing to prevent them being placed helically. In general, the strips occupy the same angular sector and both sets are identical.

Instead of using capacitors each constituted by two strips placed facing each other, it is possible to make each capacitor using four strips in diametrically-opposite pairs on the gauge.

The gauge is fitted with means enabling it to be connected to a central measuring unit suitable for exciting and then making use of the output signal from each capacitor. In another embodiment, the outer tube carries a grounded shielded connection box containing, for each capacitor, a connector for connecting a low impedance line to an excitation electrode of the set of electrodes, and a connector for connecting a high impedance line to the other electrode of the set.

The invention also provides a system for measuring the quantity of fuel in at least one tank, the system comprising at least one gauge as defined above, and a central measuring unit provided with two independent sets of electrodes each having means for exciting one of the capacitors with alternating current by feeding one of the electrodes of the corresponding set, and a channel for measuring signals coming from the other electrode of the set.

The above solution would appear a priori to be unsuitable because it might be feared that interference would occur between the two measurement channels each associated with a respective set of electrodes. However, in fact, it is found to be possible to avoid the risk of interference by using decoupling means. These means may be hardware provided on the gauge in the form of metal shielding or guard strips connected to ground, carried by the facing faces of the tubes and separating the two sets. The decoupling means may also be constituted by methods of measuring the capacitances, e.g. using two different frequencies for exciting the capacitors, thus enabling the signals to be distinguished by filters, or using excitation by means of a sequence of electrical signals in a particular repeated pattern for each channel, associated with autocorrelation processing of the signal. This second solution makes it possible to omit or reduce guard strips on the tubes or on one of them.

BRIEF DESCRIPTION OF THE DRAWINGS

The above characteristics and others will appear better on reading the following description of particular embodiments given as non-limiting examples. The description refers to the accompanying drawings, in which.

MORE DETAILED DESCRIPTION

Figure 1:
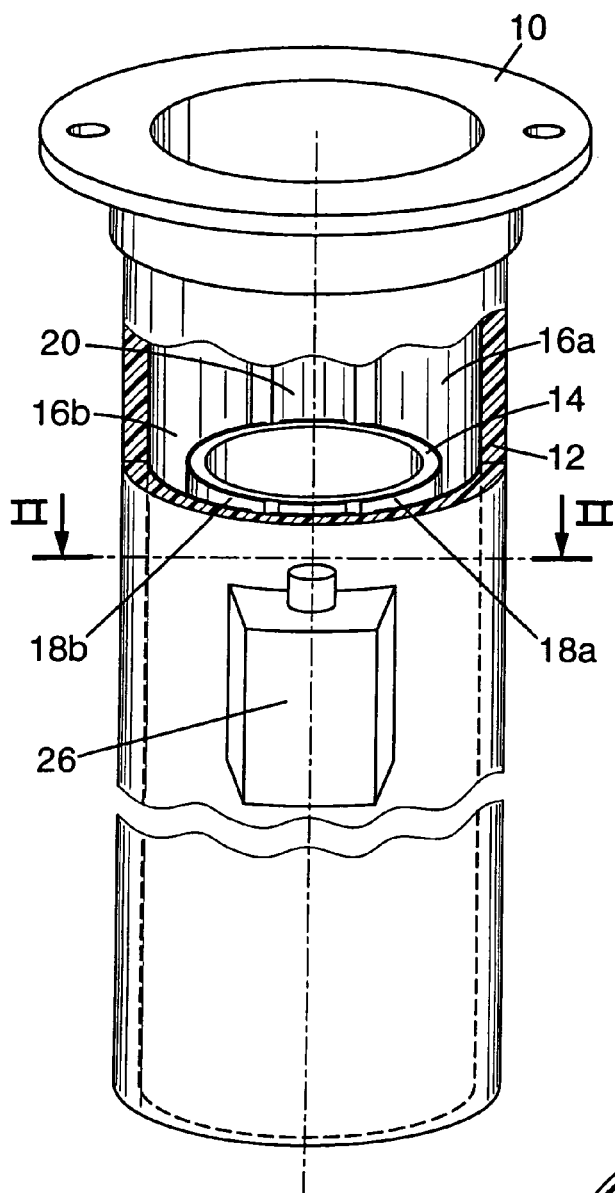
FIG. 1 is a diagrammatic perspective view of a gauge constituting an embodiment of the invention.

The gauge whose basic structure is shown in FIG. 1 comprises a base 10 for mounting to the top portion of a tank, with two concentric tubes 12 and 14 being carried by the base. The tubes are made of insulating material, e.g. fiberglass-reinforced resin. On the inside face of the outer tube 12 there are provided two diametrically-opposite longitudinal metal strips 16a and 16b each occupying a sector of the same angle α. Nevertheless, the two strips could occupy sectors of different angles. The strips may be constituted by depositing metal on the tube 12. The outside face of the inner tube 14 carries conductive strips 18a and 18b placed facing the strips 16a and 16b, and generally occupying the same angular sector α. In each pair of strips 16a & 18a and 16b & 18b, the gap between the strips is the same and is small enough for the strips to constitute a capacitor presenting sufficient capacitance to be measurable. The dielectric between the strips constituting the electrodes is constituted by air in the portion of the gauge that emerges above the fuel and by fuel in the portion that is immersed in the fuel. Consequently, the capacitance of each capacitor constituted by two facing strips varies as a function firstly of the depth of fuel in the tank in which the probe is located, and secondly as a function of the dielectric constant of the fuel.

Figure 2:
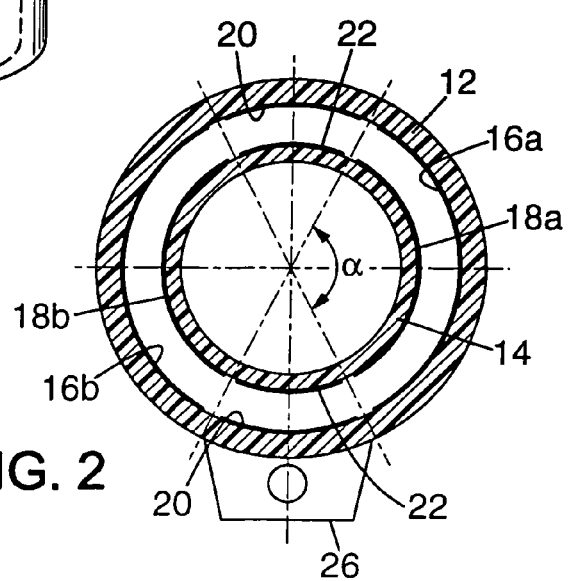
FIG. 2 is a cross-section view of the FIG. 1 gauge.

In the example shown in FIGS. 1 and 2, each of the tubes carries guard strips connected to ground and separating the two strips carried by the tube, the guard strips serving to decouple them. The two strips 20 on the inside wall of the outer tube 12 separate the strips 16a and 16b, while the guard strips 22 on the inner tube 14 separate the strips 18a and 18b.

The gauge is provided with a connection box enabling it to be connected electrically to a central measuring unit.

Figure 3:
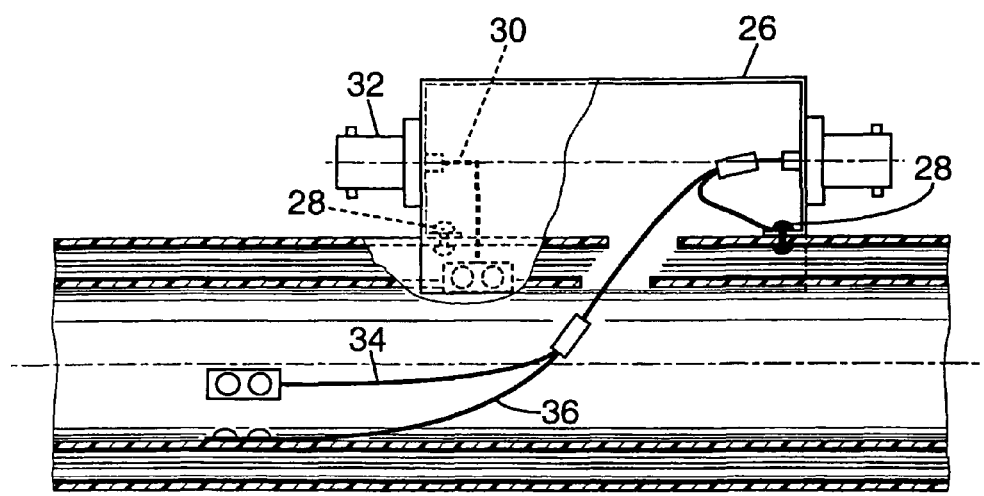
FIG. 3 shows one possible method of connection for conductors associated with one of the capacitors carried by the FIG. 1 gauge.

In the example shown in FIGS. 1 to 3, the box 26 which may be made of metal, is fixed on the outer tube 12. By way of example, it is fixed by means of rivets 28 which can also serve to provide a connection with one or two guard strips 20.

FIG. 3 shows the connections to one only of the two sets of electrodes, e.g. 16a & 18a. A low impedance connection cable 30 passes through the box via a connector 32 and serves to deliver excitation signals to the electrode 16a carried by the outer tube, which excitation signals are generally constituted by sinewave signals.

The measurement signal picked up from the strip 18a carried by the inner tube is taken to a central measuring unit by the center conductor 34 of a coaxial cable whose shielding is grounded by a conductor 36. A shielded high impedance connection is thus provided to the central measuring unit, thereby reducing disturbances.

Figure 4:
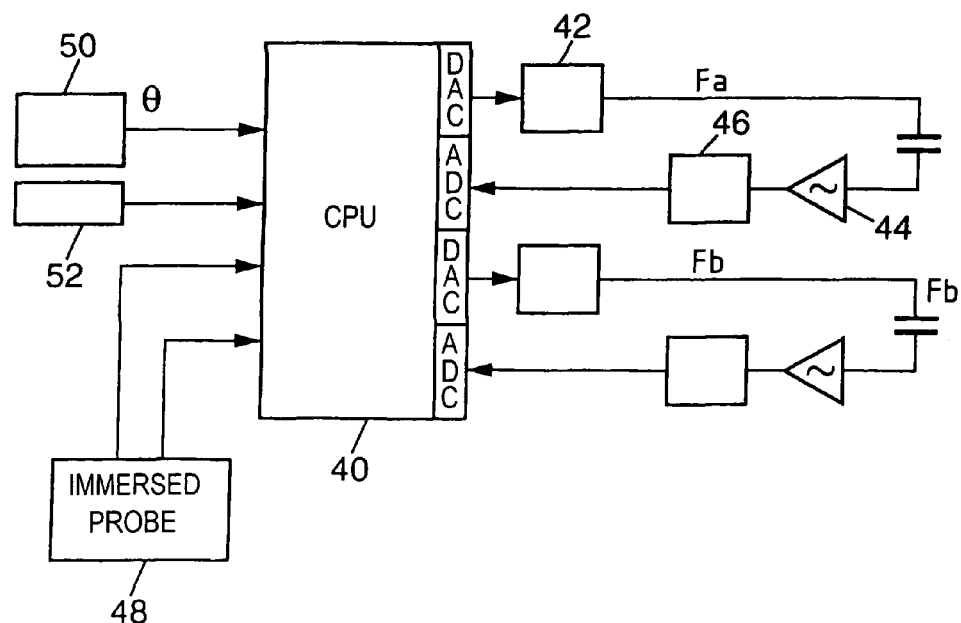
FIG. 4 is a block diagram of a system using gauges of the kind shown in FIG. 1.

The structure of a measurement system for a circuit having a single gauge wetted over a length that varies as a function of the depth of fuel is shown in FIG. 4.

The central measuring unit 40 comprises a digital computer 40. The computer receives signals of various origins enabling it to determine the residual weight of fuel in the tank into which the probe dips. In order to provide redundancy, the central unit co-operates with two loops, one of which includes the capacitor constituted by the electrodes 16a & 18a, while the other one includes the capacitor constituted by the electrodes 16b & 18b. Each loop has a respective oscillator 42 controlled by the computer via a digital-to-analog converter (DAC) and delivering an alternating excitation signal of constant amplitude over a low impedance link. The signal picked up by a high impedance link is taken to an amplifier 44 of known gain, from which it passes to a demodulator 46, possibly associated with a filter centered on the excitation frequency Fa. The demodulated signal is applied to the central computer unit via an analog-to-digital converter (ADC).

The second loop is identical to the first but possibly operates at a different frequency Fb, thereby reducing the consequences of cross-talk between the two capacitors, particularly in the absence of guard strips 20 and 22 on the tubes.

The output signal from each loop is constituted by an alternating voltage of magnitude proportional to the depth of the gauge that is wetted. The coefficient of proportionality can be determined by associating the central unit with a probe 48 having the same structure as the probe and placed in such a manner as to be permanently immersed in the same fuel as the fuel wetting the gauge. Additional sensors such as a sensor 50 for sensing the temperature θ of the fuel, and an input device 52 for inputting the characteristics of the fuel enable to convert its volume into weight.

As mentioned above, the decoupling between the measurements by means of two loops can also be provided by using not a single excitation constituted by a continuous alternating voltage, but by using two different time sequences on each of the two loops.

Autocorrelation performed by the central unit then makes it possible to process the signal received from one loop and remove therefrom the contribution coming from the other loop.

Various types of sequence can be used. One particular solution consists in adopting a sequence provided by a pseudo-random generator, having a repetition period which is several orders of magnitude greater than the duration of the electrical pulses or the electromagnetic interference that are to be feared.

What is claimed is:

1. A gauge comprising concentric inner and outer tubes made of insulating material, two capacitors each formed by a set of electrodes, each set having at least one pair of two electrodes in the form of strips extending along the gauge and placed facing each other on facing walls of the inner and outer tubes, and means for decoupling the two sets of electrodes.

2. A gauge according to claim 1, wherein the strips are disposed longitudinally, parallel to the axis of the tube, or else are disposed helically.

3. A gauge according to claim 1 or claim 2, wherein the strips occupy angular sectors of the same magnitude, and both sets of electrodes are identical.

4. A gauge according to claim 1 or claim 2, wherein each set of electrodes is constituted solely by two strips facing each other.

5. A gauge according to claim 1 or claim 2, wherein at least one of the tubes carries metal shielding or guard strips connected to ground, carried by the facing faces of the tubes and separating the two sets of electrodes.

6. A gauge according to claim 1 or claim 2, wherein the outer tube carries a grounded shielded connection box containing, for each capacitor, a connector for connecting a low impedance line to an excitation electrode of the set of electrodes, and a connector for connecting a high impedance line to the other electrode of the set.

7. A system for measuring the quantity of fuel in at least one tank, the system comprising at least one gauge comprising concentric inner and outer tubes made of insulating material, and two capacitors each formed by a set of electrodes, each set having at least one pair of two electrodes in the form of strips extending along the gauge and placed facing each other on facing walls of the inner and outer tubes and a central measuring unit provided with two independent sets of electrodes each having means for exciting one of the capacitors with alternating current by feeding one of the electrodes of the corresponding set, and a channel for measuring signals coming from the other electrode of the set.

8. A system according to claim 7, wherein decoupling is provided between the measurements by using two different frequencies for exciting the capacitors, and by discriminating between the signals by means of filters, or by using excitation by means of an electrical signal sequence in application of a particular repetitive pattern for each channel, associated with autocorrelation processing of the measurement signal.

* * * * *